United States Patent [19]

Cohen

[11] 4,447,124
[45] May 8, 1984

[54] MULTIMODE OPTICAL FIBER WITH RADIALLY VARYING ATTENUATION CENTER DENSITY

[75] Inventor: Leonard G. Cohen, Holmdel, N.J.

[73] Assignee: Bell Telephone Laboratories, Incorporated, Murray Hill, N.J.

[21] Appl. No.: 315,440

[22] Filed: Oct. 27, 1981

[51] Int. Cl.³ .............................................. G02B 5/172
[52] U.S. Cl. .................................. 350/96.30; 65/3.11; 350/96.34
[58] Field of Search ............... 350/96.29, 96.30, 96.31, 350/96.33, 96.34; 65/3.11, 3.12

[56] References Cited

U.S. PATENT DOCUMENTS

| | | | |
|---|---|---|---|
| 3,884,550 | 5/1975 | Maurer et al. | 350/96.30 |
| 3,909,110 | 9/1975 | Marcuse | 350/96.31 X |
| 4,093,343 | 6/1978 | Hargrove | 350/96.30 |
| 4,339,174 | 7/1982 | Levin | 350/96.31 |

Primary Examiner—John D. Lee
Attorney, Agent, or Firm—Eugen E. Pacher

[57] ABSTRACT

The inventive multimode fiber has total loss at an operating wavelength of at least about 0.8 db/km, typically not more than 5 db/km. At least 0.3 db/km, preferably 0.5 db/km, of the loss is due to the presence in the fiber of radially nonuniformly distributed attenuation centers, with the concentration of the centers differing by at least about 10% between the concentration minimum and the maximum. The resulting differential mode attenuation can lead to fiber having larger bandwidth than analogous fiber without differential attenuation. Preferred distributions of attenuation centers have the concentration maximum either at or near the fiber axis, or at or near the core/clad interface. Preferred attenuation centers are absorbers, with OH being a preferred absorber. The fiber is produced by a method comprising a procedure designed to result in the above-described distribution of attenuation centers, typically by maintaining the distribution introduced into the preform during preform production, or by deliberate introduction of attenuation centers into the preform during preform production.

13 Claims, 2 Drawing Figures

MULTIMODE OPTICAL FIBER WITH RADIALLY VARYING ATTENUATION CENTER DENSITY

BACKGROUND OF THE INVENTION

1. Field of the Invention

This invention relates to multimode optical fiber.

2. Description of the Prior Art

Fiber-based lightwave communication systems are expected to play an important role in voice and data transmission in the near future. Because of this large application potential, improvements in the performance characteristics of fiber for such systems are of considerable interest and may result in substantial economic benefits.

Optical fiber for use in communication systems can be either single mode fiber or multimode fiber. This application is concerned only with the latter. Such multimode fiber comprises a core, to which essentially all of the signal energy is confined, and a clad surrounding the core. Frequently a barrier layer is interposed between core and clad. See for instance Tingye Li, *Proceedings of the IEEE*, Vol. 68(10), pages 1175-1180, 1980, and P. B. O'Connor et al, *American Ceramics Society Bulletin*, Vol 55(5), pages 513-519, 1976.

The electromagnetic signal propagating in a multimode fiber, herein often referred to as "light", is usually adversely affected by at least two mechanisms: attenuation and dispersion.

The attenuation per unit length of fiber as a function of wavelength is often referred to as the loss spectrum of the fiber. It typically is comprised of several essentially irreducible contributions, e.g., Rayleigh scattering and absorption in the core matrix, and contributions that are in principle reducible. The latter are due, for instance, to absorption of the signal radiation by impurities in the fiber, to scattering from gross fiber defects, or to variations in fiber parameters, such as, for instance, variations in core diameter of refractive index profile. Current manufacturing practices typically succeed in producing fiber of sufficient uniformity to make attenuation due to the last-mentioned mechanisms negligible. And great efforts have been expended world-wide to reduce losses due to absorption by impurities in the fiber. These efforts have succeeded to the point where now fibers can be produced that have less than 1 db/km loss at appropriate wavelengths, such as for instance at 1.3 $\mu$m. In particular, loss due to OH can now be essentially eliminated.

Signal dispersion in multimode fiber is due to chromatic dispersion and to mode dispersion. Since this application is concerned substantially only with the latter, I will not discuss chromatic dispersion herein. The effect of dispersion is expressed in terms of the fiber bandwidth per unit length, or equivalently, in terms of a maximum bit rate per unit length.

In multimode fiber the signal's energy is typically distributed over many modes, and each mode has its own wave propagation path and power distribution within the fiber core. In a fiber having a core of radially uniform refractive index these propagation paths result in substantially different propagation times for the different modes, leading to severe modal dispersion. However, it is possible to greatly reduce mode dispersion by designing the fiber to have an appropriate radially varying refractive index in the core region. Such graded index lightguides can have relatively high bandwidth over a limited range of wavelenghts centered around the design wavelength for which the profile is optimized. (See for instance Tingye Li, op. cit.)

It is typical current practice in high-capacity long-haul optical communication systems to use fiber that has as little loss as possible at the design wavelength, in addition to having the largest possible bandwidth at that wavelength.

Despite the relatively high bandwidths achievable with graded index fibers the repeater spacings in long-haul fiber communication systems are often bandwidth-determined. Thus techniques for increasing the bandwidth of multimode fiberguide are of considerable interest, since this would often, for instance, permit an increase in repeater spacing. Furthermore, it would be desirable to increase the extent of the wavelength regime throughout which a multimode fiber has high bandwidth, since this would allow for instance operation of a system at two or more signal wavelengths, as for instance in a wavelength multiplexed system, or permit the upgrading of a system to operate at a different and more advantageous wavelength for which, for instance, the technology was not available at the time of installation of the system.

SUMMARY OF THE INVENTION

I have found that signal attenuation and bandwidth are not necessarily independent parameters of an optical fiber, and that the presence of appropriately distributed attenuation centers in the core of the fiber can result in fiber having greater bandwidth than similar lower-loss fiber. In particular, radially nonuniform distribution of the attenuation centers can result in differential mode attenuation, i.e., in greater attenuation of some modes as compared to other modes, and, in consequence thereof, to reduced mode dispersion.

Although essentially any entity that can cause attenuation of the signal in the fiber without resulting in substantial mode coupling is potentially useful in the practice of the invention and is included in the term "attenuation center", a preferred class of attenuation centers consist of radiation absorbing impurity atoms (or molecules) or dopant atoms, with OH being a preferred member of this class. Another exemplary attenuation center is an axially periodic radial variation of the core region, e.g., a variation in the thickness of the central layers of an MCVD preform. Such a variation can result in scattering of low order modes into high order modes. Appropriate periodic variations of the thickness of other layers of such a preform can result in preferential scattering of other modes. This approach thus permits tailoring of the mode distribution by nonabsorptive means.

The invention is practiced with fiber having a total loss at the wavelength of concern, i.e., the intended wavelength of operation of the system, of at least about 0.8 db/km, and typically less than about 5 db/km, preferably less than about 3 db/km, with loss of at least about 0.3 db/km, preferably at least about 0.5 db/km, being due to the presence of radially nonuniformly distributed attenuation centers in the core. The variation in the axial concentration profile of the centers should be at least about 10%. A distribution having its maximum at or near the fiber axis results in preferential attenuation of the lower order modes, and a distribution havings its maximum at or near the core/clad interface of the fiber results in preferential attenuation of the high-order modes. These two distribution types are the most advantageous ones for the practice of my invention.

The invention comprises a method for producing fiber, the method comprising a procedure designed to result in the above-described distribution of attenuation centers, typically by maintaining the distribution introduced into the preform during preform production, or by deliberate introduction of attenuation centers into the preform during preform production. In particular, appropriate absorbers can either be introduced deliberately during preform manufacture, or the manufacturing process modified so as not to reduce to the process limit the concentration in the core-deposit of certain impurities, e.g., of OH.

DETAILED DESCRIPTION

Fundamental to the invention is the finding that differential attenuation of some modes in multimode optical fibers can result in increased bandwidth of the fibers as compared to similar fibers without substantial differential attenuation. Based on this finding is my teaching that the performance of long-haul optical communication systems can, in the appropriate circumstances, be improved by not using fibers having the lowest possible loss at the wavelength of operation of the system, as typically is current practice, but by instead using fiber that has somewhat higher total loss at the frequency or frequencies of intended operation, but that can cause differential attenuation of appropriate modes. The manufacture of such fiber typically requires only minor change in current manufacturing procedure, but a distinct change in manufacturing philosophy, which, up until the present, has been striving for lower and lower loss fiber. These aspects of the invention will now be discussed in detail.

Figure 1:
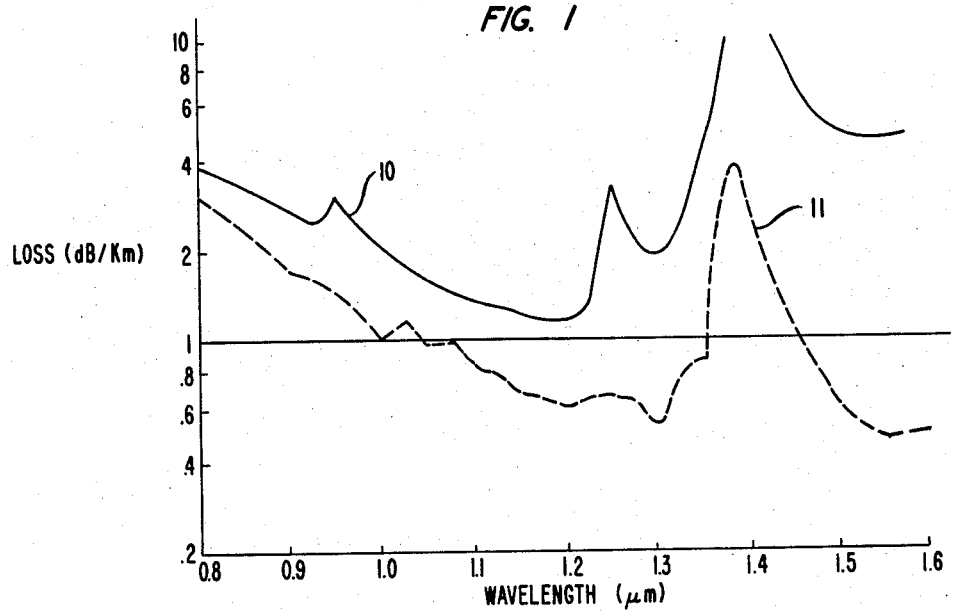
FIG. 1 shows the loss spectrum of a fiber according to the invention, and the loss spectrum of a typical relatively low loss prior art fiber.

FIG. 1 shows the loss spectrum 10 of a fiber according to the invention in which OH is the predominant attenuation center, and the loss spectrum 11 of a typical fiber with low OH content. The latter has a loss of about 0.5 db/km at 1.3 $\mu$m, most of which is due to Rayleigh scattering, and the former of about 2 db/km, due primarily to absorption by OH.

Figure 2:
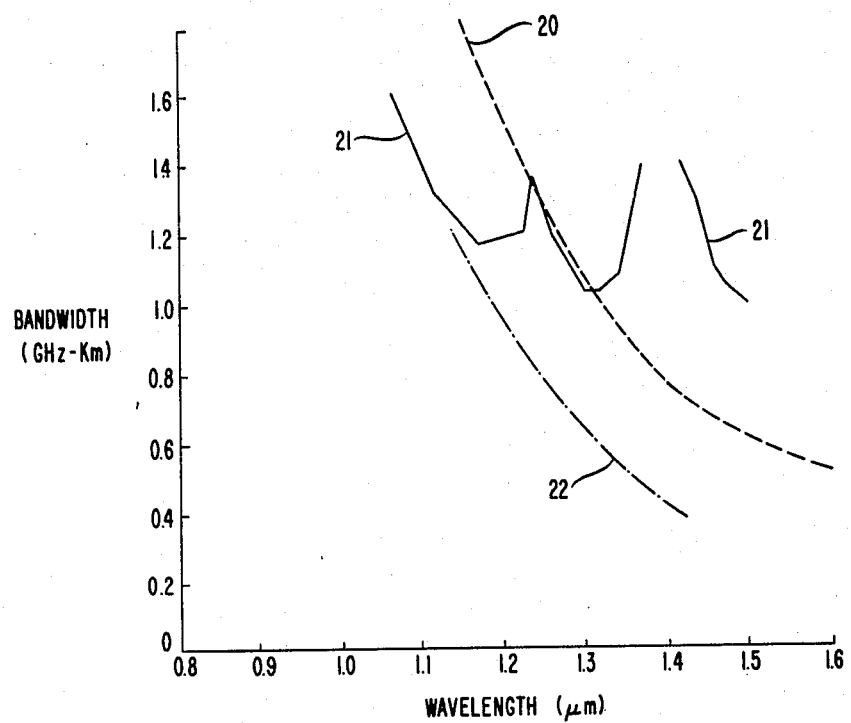
FIG. 2 shows the measured bandwidth spectrum of a fiber according to the invention, and the theoretical bandwidth spectrum for a similar prior art fiber.

FIG. 2 shows as solid line 21 the measured bandwidth spectrum 21 of the fiber whose loss spectrum is shown as curve 10 of FIG. 1, and the theoretical bandwidth spectrum 20 of a comparable prior art fiber, computed by means of methods well known in the art. See, for instance, R. Olshansky and D. B. Kect, *Applied Optics*, Vol. 15(2), pages 483–491, (1976), and J. A. Arnaud and J. W. Fleming, *Electronics Letters*, Vol. 12(7), pages 167–169, (1976). In particular, curve 20 represents the theoretical bandwidth of a graded index multimode fiber having a numerical aperture of 0.19 whose index profile is maximized for system operation at a wavelength of about 1 $\mu$m. It is to be noted that the calculation of the theoretical bandwidth assumes the absence of differential mode attenuation in the fiber, and thus applies to an ideal prior art fiber. Curve 22 is the extrapolated bandwidth that the fiber would have in the absence of differential mode attenuation, and against which the measured bandwidth of the fiber is to be compared. As can be seen from FIG. 2, the bandwidth of the fiber according to the invention exceeds the extrapolated bandwidth for wavelengths between about 1.1 $\mu$m and at least about 1.5 $\mu$m, and the theoretical bandwidth for wavelengths between about 1.3 $\mu$m and at least about 1.5 $\mu$m. The short-wavelength part of the measured curve 21 and the extrapolated curve 22 lies below the calculated curve 10 due to the deviations from ideality that exist in actual fibers, e.g., deviation of the index profile from the ideal profile that is assumed in the computation of the theoretical bandwidth.

The fiber whose bandwidth spectrum is curve 21 of FIG. 2 has an index profile designed for operation in the 0.8–1.1 $\mu$m wavelength region, and has a moderately high OH concentration along the fiber axis. Such an attenuation center profile leads to preferential attenuation of low order modes. The advantageous result of this differential attenuation is evident from FIG. 2. The measured bandwidth behaves equlitatively according to theory for wavelengths below about 1.1 $\mu$m, although the bandwidth is considerably lower than the theoretical value for the reasons indicated above. However, the measured bandwidth does not continue to descrease as does the theoretical curve, and remains higher than about 1 GHz·km for wavelengths between about 1.1 $\mu$m and about 1.53 $\mu$m. Bandwidth peaks occur at wavelengths where OH absorption peaks occur, i.e., near 1.25 $\mu$m and 1.38 $\mu$m.

The results shown in the figures were obtained with fiber having the maximum concentration of the attenuation centers at or near the fiber axis, i.e., the center of the core, and this is a preferred distribution. Another preferred distribution is one in which the maximum concentration is at or near the core/clad interface, i.e., the core perimeter. Such a distribution will differentially attenuate high order modes, and thereby can also lead to decreased mode dispersion.

Fibers according to the invention typically have total loss at the wavelength of intended operation of at least about 0.8 db/km, typically not exceeding about 5 db/km, preferably not more than about 3 db/km. The lower limit is determined by the consideration that the total loss has to include sufficient loss due to radially nonuniformly distributed attenuation centers to result in substantial differential attenuation. And the upper limit is determined by link length considerations, since the invention is of greatest utility in systems having long repeater spacings, typically about 7 km or more, which necessitate the use of fiber having relatively low loss.

A further consequence of the requirement of substantial differential attenuation is expressed by the limitation that in fibers according to the invention typically loss of at least about 0.3 db/km, preferably at least about 0.5 db/km, at the wavelength of intended operation is due to the presence of the radially nonuniformly distributed attenuation centers in the core. Since those skilled in the art are familiar with methods for determining the contributions of various loss mechanisms, e.g., Rayleigh scattering, impurity absorption, and absorption in the matrix material, to the measured total loss of optical fiber, the details of this determination will not be discussed here. See, for instance, *Optical Fiber Telecommunications*, S. E. Miller and A. G. Chynoweth, editors, Academic Press, (1979), especially pages 343–359.

And a still further consequence of the need for substantial differential attenuation in fiber according to the invention is the requirement of radially nonuniform distribution of the relevant attenuation centers in the core of the fiber, with the maximum concentration exceeding the minimum by at least about 10% of the minimum. This relatively modest radial variation can result in noticeably increased bandwidth, since a modest differential attenuation of modes having substantially different propagation time from that of the center of gravity of a signal pulse can result in appreciably decreased pulse degradation. This can be appreciated by noting that for instance a relevant statistical parameter, the second moment of the power distribution, depends on the square of the difference in propagation time. Therefore, the modes whose propagation time differs relatively much from that of the center of gravity of the pulse contribute a disproprortionate amount to this parameter, and even modest differential attenuation of these modes, of the order of 10%, results in a substantial decrease of the second moment of the power distribution.

The practice of my invention is not confined to fiber manufactured by any particular method for producing optical fiber. For instnace, such fibers can conveniently be drawn from solid preforms produced either by the Modified Chemical Vapor Deposition (MCVD) method (see, for instance, U.S. Pat. No. 4,217,027, issued Aug. 12, 1980, to J. B. MacChesney and P. B. O'Connor; and J. B. MacChesney, *Proceedings of the IEEE*, Vol. 68(10), pages 1181–1183, (1980), or by the Vapor-Phase Axial Deposition method (VAD), (see, for instance, U.S. Pat. No. 4,135,901, issued Jan. 23, 1979, to K. Fujiwara et al, and T. Izawa and N. Inagaki, *Proceedings of the IEEE*, Vol. 68(10), pages 1184–1186, (1980)).

Attenuation centers can be introduced into the deposited layers of MCVD preforms by an convenient method, including doping with an appropriate impurity species. A preferred method for obtaining fiber having a radially varying concentration of attenuation centers, with the maximum being at or near the fiber axis, is to draw the fiber from an MCVD preform in which an appropriate impurity has been diffused into the innermost core layers prior to or during collapse of the tubular preform into a solid cylinder.

A convenient and preferred attenuation center in silica-based fibers is OH, which results when hydrogen diffuses into the silica network. In prior art methods great efforts are typically undertaken to prevent hydrogen from being incorporated into the core or to eliminate hydrogen again from the preform body, and these efforts have succeeded to the point where essentially hydrogen-free fiber can be produced.

During the production of MCVD preforms, OH can be introduced into the last-deposited core layers during the collapse of the preform, and this is typically prevented through provision of a chlorine-rich atmosphere inside the tubular preform during collapse. By appropriately adjusting the amount of chlorine present during the collapse phase this formation of OH can be controlled. The resulting preform, with a predetermined concentration of OH in the last-deposited core layers, will yield upon collapse a solid preform having the maximum OH concentration at or near the preform axis. And fiber drawn from such a preform will have an analogous OH profile. This approach constitutes a preferred method for introducing OH, an absorber and a preferred attenuation center, into fibers according to the invention.

OH is typically eliminated from VAD preforms by "drying" with chlorine prior to consolidation of the porous cylindrical deposit. In one version of the VAD preform manufacturing process a fused quartz tube is shrunk around the dried cylindrical deposit to provide the outer clad of fiber drawn from the composite preform. Since available fused quartz typically contains a substantial amount of OH, some of which diffuses into the deposited material during shrinking and fiber drawing, a deposited clad is typically interposed between the core and the outer clad, to form a physical diffusion barrier.

A preferred method for obtaining fiber having a radially varying concentration of attenuation centers, with the maximum being at or near the core/clad interface of the fiber, is to draw the fiber from a VAD preform in which an appropriate impurity has been diffused into the cylindrical deposit during or after the shrinking of the hydrogen-containing outer clad material around the deposit. In particular, by, for instance, appropriately adjusting the thickness of the deposited clad a controlled amount of hydrogen can be incorporated into the deposited clad material and the core material near the core/clad interface, and therefore also into the fiber drawn from the composite preform. This constitutes another preferred method for introducing OH into fibers according to the invention.

EXAMPLE

An MCVD preform was prepared by depositing a phosphoborosilicate ($P_2O_5$-$B_2O_3$-$SiO_2$) barrier and germania phophosilicate ($GeO_2$-$P_2O_5$-$SiO_2$) graded index core layers on the inside of a fire-polished fused quartz tube. The preform was collapsed, with substantially no chlorine present in the collapse atmosphere. Fiber was drawn from the preform in the usual manner. The resulting fiber has a core profile shape that is well graded for the 0.8–1.1 $\mu$m region, and a numerical aperture of 0.19. The fiber also has a moderately high OH concentration, as revealed by significant absorption peaks near 0.95, 1.25 and 1.38 $\mu$m. The total loss at 1.3 $\mu$m is about 2 db/km, and the total bandwidth at 1.3 $\mu$m is about 1.05 GHz·km. The OH distribution in the fiber core strongly peaks at or near the fiber axis, i.e., the center of the core, as verified by far-field radiation pattern measurements at various wavelengths and for various launch conditions.

Fiber according to the invention can for instance be advantageously used in systems requiring high bandwidth at two or more widely spaced bandwidths. The above-described exemplary fiber for instance has loss at about 0.8 $\mu$m that is only slightly higher than that of a low-OH fiber, and a bandwidth of about 1.3 GHz·km at that wavelength. And at 1.3 $\mu$m, a wavelength of great current interest, the exemplary fiber has relatively modest loss, but a bandwidth that is substantially as large as at 0.8 $\mu$m, a wavelength within the band for which the index profile was optimized. Thus the exemplary fiber can be advantageously used for operation at both about 0.8 $\mu$m and about 1.3 $\mu$m.

What is claimed is:

1. Multimode optical fiber for transmitting signals at least at a first wavelength, the fiber comprising a core and a clad and having a loss at the first wavelength of at least about 0.8 db/km, with a loss of at least about 0.3 db/km being caused by the presence of attenuation centers in the core, characterized in that the core has a radially varying attenuation center concentration profile in at least part of the fiber, with the maximum concentration exceeding the minimum concentration by at least about 10%.

2. Optical fiber according to claim 1 wherein the fiber has a loss at the first wavelength not larger than about 5 db/km.

3. Optical fiber according to claim 2 wherein the attenuation centers consist substantially of centers that absorb electromagnetic radiation at some wavelengths including the first wavelength.

4. Optical fiber according to claim 3 wherein the maximum of the attenuation center profile is located substantially at the center of the core.

5. Optical fiber according to claim 3 wherein the maximum of the attenuation center profile is located substantially at the core/clad interface.

6. Optical fiber according to claim 4 or 5 wherein the attenuation centers consist substantially of OH.

7. Method for producing multimode optical fiber having a core and a clad and a loss at a first wavelength of at least about 0.8 db/km, with a loss of at least about 0.3 db/km being caused by the presence of attenuation centers in the core, the method comprising drawing a fiber from a preform, characterized in that the method further comprises a procedure designed to result in a radially varying attenuation center profile in the fiber core in at least part of the fiber drawn from the preform, with the maximum concentration in the core exceeding the minimum concentration in the core by at least about 10%, the procedure selected from the group of procedures consisting of (1) deliberately introducing the attenuation centers into the preform during production of the preform, and (2) substantially maintaining a radially varying distribution of attenuation centers existing in the preform.

8. Method according to claim 7 wherein the fiber has a loss at the first wavelength not larger than about 5 db/km.

9. Method of claim 8, wherein the attenuation centers consist substantially of centers that absorb electromagnetic radiation at some wavelengths including the first wavelength.

10. Mehtod of claim 9, wherein at least a substantial part of the absorbing centers are introduced during collapsing the preform into a solid preform.

11. Method of claim 9, wherein at least a substantial part of the absorbing centers are introduced during drawing of the fiber from the preform.

12. Method of claim 10 or 11, wherein the attenuation centers consist substantially of OH.

13. Multimode optical fiber produced by the method of claim 7.

* * * * *